Dec. 17, 1957   M. J. STATEMAN ET AL   2,817,060
NON-DESTRUCTIVE FLAW DETECTION APPARATUS
Filed July 6, 1954

INVENTORS
MURRAY J. STATEMAN
HAROLD R. HOLLOWAY
BY
ATTORNEY

— # United States Patent Office 2,817,060
Patented Dec. 17, 1957

2,817,060

NON-DESTRUCTIVE FLAW DETECTION APPARATUS

Murray J. Stateman, Wantaugh, and Harold R. Holloway, Fresh Meadows, N. Y., assignors, by mesne assignments, to the United States of America as represented by the United States Atomic Energy Commission Application July 6, 1954, Serial No. 441,694

1 Claim. (Cl. 324—37)

The present invention relates to a new and improved method and apparatus for the non-destructive detection of flaws in electrically conductive articles such as, for example, test specimens.

In many of the modern industries equipped for mass production there are growing needs for improved methods whereby faulty products may be efficiently detected to the end that corrective measures can be quickly applied. In particular, the non-destructive flaw detection techniques are to be desired and various of these techniques, such as the optical, radiological, acoustic, magnetic and electrical methods have been proposed and have been employed with varying degrees of success.

Metal fabricators, for example, require that their stock materials supplied in sheets, rods, tubes and the like contain no internal fissures or cracks which would cause the final product to fail during preliminary machining or after fabrication. As a further example, food processing establishments often use similar techniques to detect metal or other foreign matter in their products. Similar examples of potential usages of the present invention will be apparent to those skilled in the art.

Generally, the test as to quality of the material is conducted upon representative test specimens of a large amount of the material in accordance with recognized quality control procedures. A manufacturer of metal products, therefore, has the choice of employing one of the above mentioned non-destructive testing techniques or of using the conventional destructive test which usually requires sawing a section of a specimen for microscopic examination or for running tensile or compressive tests to failure of the specimen.

The present invention relates to eddy current non-destructive testing for hidden flaws and represents an improvement on present methods of this type. It is equally applicable to the testing of a fabricated completed article or to the testing of a specimen of such article. One known method includes establishing a magnetic field in the article under test by means of an external source. This magnetic field produces an eddy current flow in the electrically conductive article. If a flaw is present in the article, the eddy current flow will be disturbed and flow about the flaw. This change in concentration of the eddy current flow is then detected externally.

For a cylindrical article or test specimen, for example, this known method of eddy current flaw detection uses a circumferentially wound coil in the form of a solenoid. Energization of the solenoid produces a magnetic field in a direction generally parallel to the axis of the specimen. A secondary coil having only a few turns is circumferentially wound interiorly of the solenoid. This secondary coil is sensitive to the eddy current flow in the specimen. Therefore, a change in this eddy current flow arrangement will cause a change in the output current picked up in the secondary coil.

The difficulty with the above-described arrangement is that its sensitivity is limited. That is, the lines of flux set up by the primarmy coil, thread the secondary coil at all times. Therefore, there is always some minimum output current induced in the secondary coil. A change in this minimum output current must be appreciable enough to be detected.

Another difficulty with the above-described conventional arrangement is the "end effect" problem. That is, when the end of the test article approaches the secondary measuring coil, this large change in the conductivity masks any defects that might be present in this portion of the test article.

The present invention supplies a more sensitive arrangement in that no output current is induced in the secondary measuring coil unless some flaw is present in the test article. Similarly, apparatus embodying the present invention can be constructed so as to eliminate the unwanted "end effect."

More particularly the present invention includes means for establishing an alternating homogeneous magnetic field in the article under test, the magnetic field being parallel to the axis of the test article; detecting means responsive to components of the magnetic field, directed away from the axis of the article; the detecting means being disposed adjacent the outer surface of the test article and means for amplifying and displaying any current impulse induced in said detecting means.

It is therefore an object of the present invention to provide a new and improved method and apparatus for the non-destructive detection of flaws in test articles.

Another object of the present invention is to provide a new and improved method and apparatus for the non-destructive detection of flaws in test articles where flaws occurring near the end portions of the article can be detected with improved sensitivity.

Still another object of the present invention is to provide a new and improved compact apparatus for the non-destructive detection of flaws at any depth below the surface of the test article.

Many other objects and advantages of the present invention may best be seen by reference to the accompanying drawings wherein.

Figure 1:
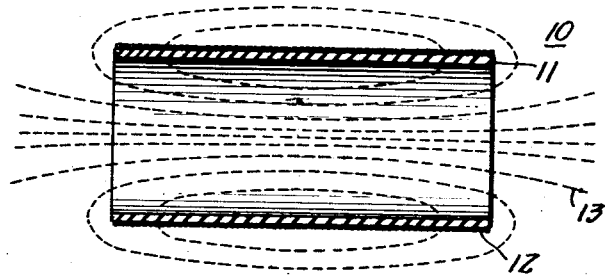
Figure 1 is a diagrammatic representation of the magnetic field produced in a homogeneous cylindrical test article.

Referring now to Figure 1, a conventional solenoid coil 10 is shown made up from an inner coil form 11 and a winding 12. Energization of the winding 12 by conventional power supply means produces an alternating homogeneous magnetic field whose lines of flux are indicated by dotted lines 13. It should be noted that near the center of the solenoid coil essentially all of the lines of flux of the established magnetic field are parallel to the axis of the solenoid.

Figure 2:
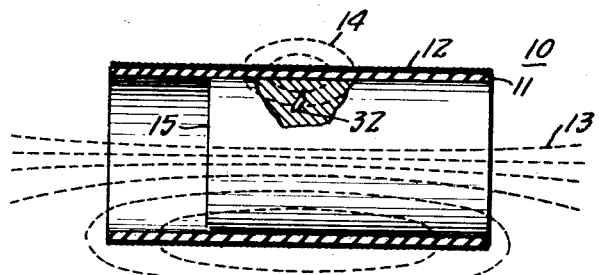
Figure 2 is a diagrammatic representation of the magnetic field formed about a flaw in a test article.

Referring now to Figure 2, the solenoid 10 is shown with a cylindrical test article 15 inserted parallel therein. The test article 15 in this case contains some flaw which may be a fissure, a void or some body of a different constitution. From the dotted lines 14 it can be seen that such a flaw distorts the magnetic field so that components are produced which are perpendicular to the axis of the solenoid 10. Therefore, it is seen that if a method of detection is developed which is only responsive to components of the magnetic field directed away from the axis of the test article, a sensitive measuring means employing such method can achieve the objectives desired.

Figure 3:
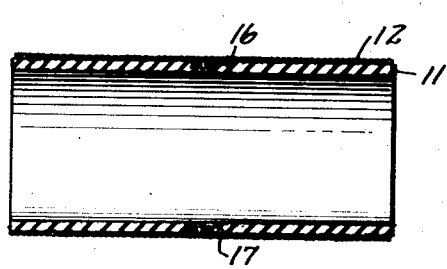
Figure 3 is a cross-sectional view of apparatus embodying the present invention.

Such an arrangement is shown in Figure 3. Here the the coil form 11 contains in its surface two pickup coils 16 and 17. It is noted that these coils are placed adjacent the inner surface of the coil winding 12 and that their axes are normal to the axis of the solenoid 10 and coil form 11.

Figure 4:
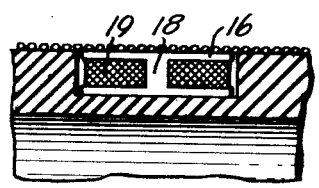
Figure 4 is a cross-sectional view showing the pick-up coil of the present invention in more detail.

An enlarged view of pickup coil 16 is shown in Figure 4. This coil includes a coil form 18 with a multilayer winding 19.

Figure 5:
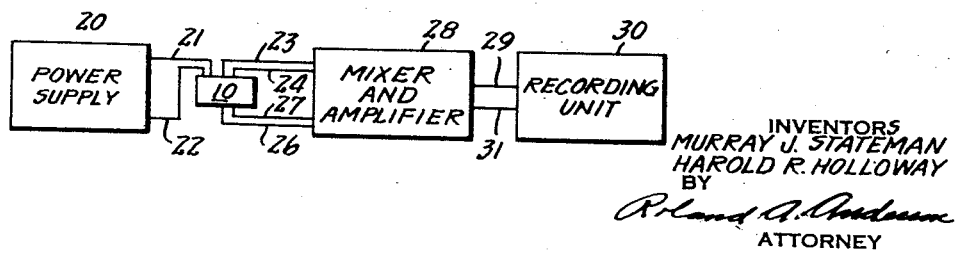
Figure 5 is a diagrammatic representation of apparatus embodying the present invention in conjunction with conventional electronic instruments.

It is apparent that components of the magnetic field which are directed parallel to the axis of the solenoid 10 will not thread the coil 16 or 17 and accordingly no output current will be induced in these pickup coils. Referring to Figure 5, the schematic representation for using this feature is shown. The power supply 20 which may be any conventional supply capable of generating alternating current is connected on conductors 21 and 22 to the coil 12 and solenoid 10. To the coil 16, conductors 23 and 24 are connected, and similarly conductors 26 and 27 are connected to the other pickup coil 17. Conductors 23, 24, 26 and 27 are connected to a mixer and amplifier 28. Mixer and amplifier 28 can include any conventional arrangement for comparing the outputs of coils 16 and 17 and amplifying their difference.

The output of mixer and amplifier 28 is connected to recording unit 30 by means of conductors 29 and 31. The recording unit 30 can be of the conventional voltmeter type where a pen records on moving paper a permanent record of the output voltage being applied to the unit 30.

In operation, therefore, the power supply 20 is operated to energize the solenoid 10 resulting in the magnetic field configuration shown in Figure 1. Accordingly, no output current will be induced in coil 16 or 17 and recording unit 30 will indicate a zero output voltage. When a cylindrical test article is inserted within the solenoid 10, the magnetic field will be undistorted if this test article is completely homogeneous. Therefore, the reading on recording unit 30 will be unchanged.

The test article is inserted through the solenoid 10 as shown in Figure 2. As this test article is moved past the center of the solenoid, the portion of the article between the pickup coils is tested. If desired, the test article could be simultaneously rotated. When a flaw is present in the article under test, the eddy currents induced in the test article flow about the flaw distorting the induced secondary field and producing a disfiguration shown in Figure 2.

Here it is seen that the magnetic field about the flaw 32 contains components directed away from the axes of the solenoid 10 and about the coil 16. Therefore, a voltage will be induced in the coil 16 directly proportional to the size and location of the flaw and the resultant distortion of the magnetic field. This output voltage will be applied on conductors 23 and 24 to the mixer and amplifier unit 28. At the same time no output voltage appears on conductors 26 and 27. Therefore, when these voltages are compared on unit 28, the difference voltage will be that voltage induced by the flaw 32. This voltage is applied on conductors 29 and 31 to the recording unit 30.

Accordingly, the result is a permanent record of a voltage pulse proportional to the size of the flaw in the test article. It is apparent that if the test article is rotated, only one pickup coil need be used with a conventional amplifying unit instead of a mixing and amplifying unit. However, the use of two coils 16 and 17 placed diametrically opposite each other with respect to the cylindrical test article has the advantage as will be described hereinbelow.

Referring to Figure 2, it can be seen that when the front end of the test article 15 is inserted in the solenoid as it approaches the area adjacent the pickup coil, the flux pattern will be appreciably distorted. This is due to the marked change in electrical conductivity between the area normally in the solenoid and the conductivity of the test article. Once the front end of the cylindrical article 15 has passed the sensitive area that problem is no longer present. However, when the back end of the test article passes through the sensitive area, the same problem arises.

With only one pickup coil the "end effect" due to the abrupt conductivity change will be recorded as a flaw, that is, the distortion of the magnetic field at the front and back ends will induce a current in the pickup coil. With only one coil being used, this current will be recorded on the unit 30. Therefore, if any flaw is present at either the front or back end of the test article, its effect will be masked by the "end effect" phenomena. With conventional instruments using the eddy current testing techniques, this "end effect" cannot be overcome.

However, with the arrangement shown in Figure 3 where the coils 16 and 17 are equal and diametrically opposed to one another with respect to the cylindrical test article, a different result will be obtained. Upon insertion of the front end of the article 15 the abrupt change of conductivity in the sensitive area will induce exactly the same current in each of the coils 16 and 17. The output voltages applied to the mixing and amplifying unit 28 will accordingly be equal. Since the amplified output appearing on conductors 29 and 31 is proportional to the difference between these two voltages as described above, zero output will be obtained. Therefore, there will be no indication on the recording unit 30 of any flaw being present due to this "end effect."

If, on the other hand, there is a flaw near the front or back end of the test article, this flaw will induce a different current in one of the coils depending on which coil is the closer one. Therefore, the difference voltage appearing on output conductors 29 and 31 of Figure 5 will be due entirely to the flaw. This difference voltage as it is recorded on unit 30 will point up any flaws that are present.

The apparatus is sensitive to flaws located different distances beneath the surface of the test article. If it is desired to find surface defects, a comparatively high frequency is used for the energization of solenoid 10. On the other hand, if it is desired to measure flaws well beneath the surface a corresponding lower energization frequency is used.

While the salient features of the present invention have been described in detail with respect to only a few embodiments, it will of course be apparent that numerous modifications may be made within the spirit and scope of this invention and it is therefore not desired to limit the invention to the exact details shown except insofar as they may be defined by the following claim.

We claim:

Apparatus for non-destructive flaw detection in an electrically conductive cylindrical article which comprises, in combination, a coil form, a solenoid coil having a diameter larger than the diameter of the article under test wound upon said coil form, power supply means for energizing said solenoid coil to establish an alternating homogeneous magnetic field parallel to the axis of said cylindrical article, a pair of small multilayer coils disposed in said coil form near the inner surface of said solenoid adjacent the outer surface of said article, each of said pairs of coils being diametrically disposed about said article with respect to each other, the axes of said multilayer coils being perpendicular to the axis of the cylindrical article and to said magnetic field, said pair of coils being connected in series opposition and means for amplifying and detecting any current flowing from the combined output circuit of said pair of coils.

References Cited in the file of this patent

UNITED STATES PATENTS

| Re. 15,859 | Burrows | June 17, 1924 |
| 2,065,118 | Davis | Dec. 22, 1936 |
| 2,150,922 | Hay | Mar. 21, 1939 |
| 2,477,057 | Grady | July 26, 1949 |
| 2,511,233 | Anderson | June 13, 1950 |